(No Model.)

A. C. REX.
LEMON SQUEEZER.

No. 256,372. Patented Apr. 11, 1882.

Attests:
R. S. Child Jr.

Inventor
Alfred C. Rex
By his atty.

United States Patent Office.

ALFRED C. REX, OF PHILADELPHIA, PENNSYLVANIA.

LEMON-SQUEEZER.

SPECIFICATION forming part of Letters Patent No. 256,372, dated April 11, 1882.

Application filed February 13, 1882. (No model.)

*To all whom it may concern:*

Be it known that I, ALFRED C. REX, of the city of Philadelphia, county of Philadelphia, and State of Pennsylvania, have invented an Improvement in Lemon-Squeezers, of which the following is a specification.

My invention relates to lemon-squeezers in general, but more particularly to that class in which a glass receiving-cup is used; and it consists in certain constructions fully set forth in the following specification, and shown in the accompanying drawings, which form part thereof.

The object of this invention is to construct a lemon-squeezer with a removable glass juice-receiver, which receiver shall rest upon a cushion and be adapted to be securely retained in the frame of the squeezer, and also to combine with said receiver a lever having its pressing-surface covered with a non-corrodible substance.

Figure 1:
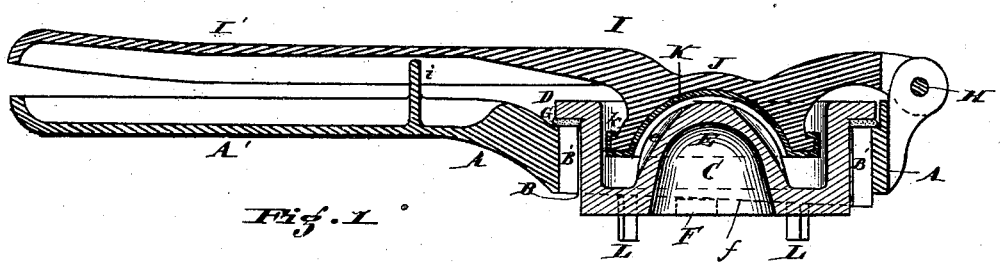
Figure 2:
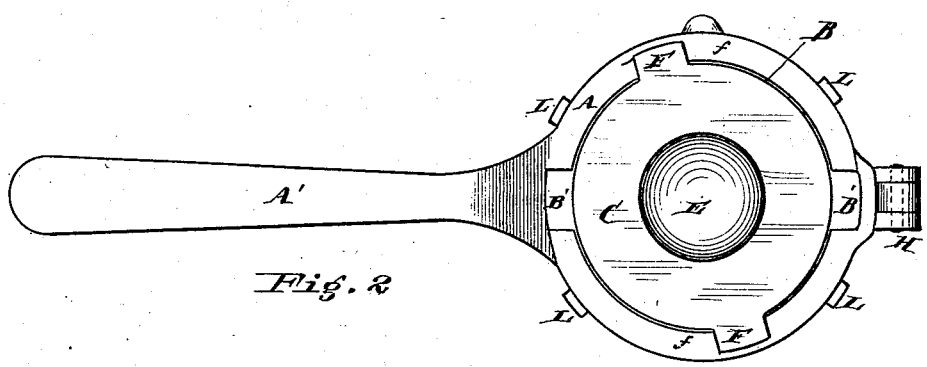
Figure 3:
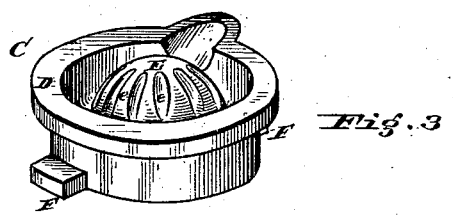

In the drawings, Figure 1 is a sectional elevation of my improved lemon-squeezer. Fig. 2 is a plan of same with the bottom or under side turned up, and Fig. 3 is a perspective view of the glass cup.

A is the frame of the lemon-squeezer, and is furnished with a hole or an aperture, B, in which the glass cup or juice-receiver C rests. This cup C is provided at the top with a flange, D, which projects over the frame A, as shown, and a rubber or other elastic band, G, is placed under said flange, and upon which the cup rests to prevent its breaking and allow of its being more easily secured in the frame A. The bottom of said cup is provided with two lugs, F, on opposite sides, and the bottom is raised, as at E, and is provided with small grooves e, radiating from the center to allow the escape of the juice.

The frame A is provided with grooves or slots B' upon opposite sides of the aperture B, to allow the lugs F on the cup G to pass through said aperture. After the cup has been set into the frame A it is turned, and the lugs F and flange D hold the cup firmly in the frame. The frame is provided with feet L and a handle, A', having a pin or projection, i.

The lever I, provided with handle I', is hinged to the frame A at H, and is provided with a hollow or inverted cup, J, covered with a sheeting, K, of tin or other non-corrodible metal to the action of citric acid, the said sheet K being secured in place by turning over the edge k. This part J K fits over the raised part E of cup C, and the projection i prevents the lever I breaking the glass cup.

The bottom rims, f, of the frame A are slightly inclined from the apertures or slots B', as shown in Fig. 1, so that after the cup C has been placed in the frame A and is turned the lugs F run upon the rims f and clamp the cup C firmly down upon the frame A.

Having now described my invention, what I claim as new, and desire to secure by Letters Patent, is—

1. In a lemon-squeezer, the frame A, provided with the aperture B and slots or recesses B', in combination with the cup C, having flange D and lugs F, and elastic ring G, substantially as and for the purpose specified.

2. In a lemon-squeezer, the frame A, provided with handle A', aperture B, and slots or recesses B', in combination with glass cup C, having flange D and lugs F, elastic band G, lever I, provided with handle I', and hollow surface J, covered with sheet metal K, not corrodible by citric acid, substantially as and for the purpose specified.

3. In a lemon-squeezer, the combination of cup C, having flange D at the top and lugs F at the bottom, with frame A, provided with aperture having slots B' and inclined faces or rims f, substantially as and for the purpose specified.

4. In a lemon-squeezer, a pressure-lever provided with an inverted cup or hollow part having a flat rim, in combination with a non-corrosive sheet-metal cover pressed into said hollow part and clamped around the rim, as shown.

In testimony of which invention I hereunto set my hand.

ALFRED C. REX.

Witnesses:
R. S. CHILD, Jr.,
ERNEST H. HUNTER.